United States Patent
Sittner et al.

(10) Patent No.: US 11,118,485 B2
(45) Date of Patent: Sep. 14, 2021

(54) SOLENOID VALVE CONTROL FOR NOISE REDUCTION IN A VARIABLE VALVE LIFT SYSTEM

(71) Applicant: Schaeffler Technologies AG & Co. KG, Herzogenaurach (DE)

(72) Inventors: Kevin Sittner, West Bloomfield, MI (US); Hermann Neubeck, Troy, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/792,554

(22) Filed: Feb. 17, 2020

(65) Prior Publication Data

US 2020/0182100 A1 Jun. 11, 2020

Related U.S. Application Data

(62) Division of application No. 15/687,623, filed on Aug. 28, 2017, now Pat. No. 10,612,427.

(51) Int. Cl.
*F01L 1/18* (2006.01)
*F01L 1/24* (2006.01)
(Continued)

(52) U.S. Cl.
CPC ............... *F01L 1/185* (2013.01); *F01L 1/047* (2013.01); *F01L 1/16* (2013.01); *F01L 1/24* (2013.01); *F01L 9/14* (2021.01); *F02D 13/02* (2013.01); *F01L 13/0005* (2013.01); *F01L 2001/0537* (2013.01); *F01L 2201/00* (2013.01); *F01L 2305/00* (2020.05); *F01L 2810/04* (2013.01);
(Continued)

(58) Field of Classification Search
CPC ..... F01L 1/24; F01L 9/025; F01L 1/16; F01L 13/0005; F01L 2820/043; F01L 2201/00; F01L 2001/34446; F01L 9/02; F01L 9/021; F01L 1/3442; F02D 13/0226; F02D 13/02; F02D 2200/024
USPC .......................................... 123/90.12, 90.11
See application file for complete search history.

(56) References Cited

U.S. PATENT DOCUMENTS

| 4,466,390 A * | 8/1984 | Babitzka | F01L 9/025 |
| | | | 123/90.12 |
| 5,839,400 A * | 11/1998 | Vattaneo | F01L 1/26 |
| | | | 123/90.16 |

(Continued)

*Primary Examiner* — Patrick Hamo
*Assistant Examiner* — Wesley G Harris
(74) *Attorney, Agent, or Firm* — Matthew V. Evans (57) ABSTRACT

A variable valve lift (VVL) system for an internal combustion engine is provided that utilizes hydraulic fluid supply pressure feedback to provide noise free operation. The VVL system includes a high pressure pump, a solenoid valve, a pressure translating device, a one-way valve, and a hydraulic fluid pressure sensor. The high pressure pump is fluidly connected to the solenoid valve and pressure translating device by at least one fluid gallery that forms a high pressure chamber. The solenoid valve selectively fluidly connects the high pressure chamber to a middle pressure chamber formed by at least one fluid gallery that fluidly connects the one-way valve to the solenoid valve. The hydraulic fluid pressure sensor is arranged to detect a hydraulic fluid supply pressure of the one-way valve and provides feedback to an electronic controller that determines a proper fluid intake opening timing of the solenoid valve.

19 Claims, 7 Drawing Sheets

(51) Int. Cl.
*F01L 1/047* (2006.01)
*F01L 1/16* (2006.01)
*F02D 13/02* (2006.01)
*F01L 9/14* (2021.01)
*F02D 41/00* (2006.01)
*F01L 1/053* (2006.01)
*F01L 13/00* (2006.01)

(52) U.S. Cl.
CPC . *F01L 2820/043* (2013.01); *F02D 2013/0296* (2013.01); *F02D 2041/001* (2013.01); *F02D 2200/023* (2013.01); *F02D 2200/024* (2013.01)

(56) References Cited

U.S. PATENT DOCUMENTS

| | | | |
|---|---|---|---|
| 8,091,530 B2 | 1/2012 | Sumilla et al. | |
| 2004/0000276 A1 | 1/2004 | Borean | |
| 2006/0157010 A1* | 7/2006 | Moriwaki | F01L 9/02 123/90.13 |
| 2006/0241846 A1 | 10/2006 | Gaessler | |
| 2010/0168987 A1* | 7/2010 | De Cristoforo | F01L 9/021 701/105 |
| 2013/0304352 A1* | 11/2013 | Macfarlane | F01L 9/025 701/102 |
| 2014/0222313 A1 | 8/2014 | Keller | |
| 2016/0169063 A1* | 6/2016 | Gentile | F02D 41/061 123/90.12 |

* cited by examiner

|  | Engine RPM | | | | |
|---|---|---|---|---|---|
| Engine Oil Temperature | critical hydraulic fluid supply pressure values | | | | |
| | | | | | |
| | | | | | |
| | | | | | |
| | | | | | |

Figure 4A

|  | Influence Factor 1 | | | | |
|---|---|---|---|---|---|
| Influence Factor 2 | | | | | |
| | | | | | |
| | | | | | |
| | | | | | |
| | | | | | |

SOLENOID VALVE CONTROL FOR NOISE REDUCTION IN A VARIABLE VALVE LIFT SYSTEM

CROSS REFERENCE TO RELATED APPLICATIONS

This application is a divisional of U.S. patent application Ser. No. 15/687,623, filed Aug. 28, 2017, the disclosure of which is incorporated in its entirety by reference herein.

TECHNICAL FIELD

Example aspects described herein relate to variable valve lift (VVL) systems for use in internal combustion (IC) engines, particularly those that utilize hydraulic fluid for actuation.

BACKGROUND

More stringent fuel economy regulations in the transportation industry have prompted the need for improved efficiency of the IC engine. Light-weighting, friction reduction, thermal management, variable valve timing, and a diverse array of variable valve lift technologies are all part of the technology toolbox for IC engine designers.

VVL systems of IC engines often manage hydraulic fluid flow, leakage or pressure within a network of fluid galleries to vary the output of these systems. An example of this type of VVL system can be found in U.S. Pat. No. 5,839,400. Precise control of these hydraulic systems is required to achieve optimum engine performance, and maintaining this performance over several years and miles is critical to meeting customer demands.

Noise, vibration and harshness (NVH) demands are becoming more and more stringent for today's automobiles. Cabin noise levels continue to decrease with the aid of noise-cancelling technology, active and passive vibration control components, glass technologies and efforts to reduce IC engine noise. IC engine noise sources can include combustion, mechanical, or fluid-induced noises. Fluid-induced noises can include air flow (intake and exhaust) and hydraulic fluid flow noises. For hydraulically controlled VVL systems, fluid flow noises can be audible, especially when large pressure differentials exist within the fluid gallery network. Such large pressure differentials can be present in cold conditions when hydraulic fluid pressure is high and filling of galleries or chambers is necessary for valve actuation. To alleviate such fluid flow noises, hardware and/or fluid gallery modifications can be implemented, however, such solutions can be costly and require valuable development time. A low-cost resolution is required that minimizes integration effort within a VVL system.

SUMMARY

A VVL system for an IC engine is provided that includes a high pressure pump, a solenoid valve, a pressure translating device, a one-way valve, and a hydraulic fluid pressure sensor. The high pressure pump, actuated by an actuator, is fluidly connected to the solenoid valve and pressure translating device by at least one fluid gallery that forms a high pressure chamber. The one-way valve is fluidly connected to an inlet of the solenoid valve by at least one fluid gallery that forms a middle pressure chamber. Therefore, the solenoid valve selectively fluidly connects the middle pressure chamber to the high pressure chamber. The hydraulic fluid pressure sensor is arranged to detect a hydraulic fluid supply pressure of the one-way valve and provides a hydraulic fluid supply pressure signal to an electronic controller. The electronic controller is configured to adjust a fluid intake opening timing of the solenoid valve based on a comparison of the hydraulic fluid supply pressure signal to a critical hydraulic fluid supply pressure.

A method for controlling a solenoid valve of a VVL system is provided that includes: receiving a hydraulic fluid supply pressure signal from a hydraulic fluid pressure sensor; comparing the received hydraulic fluid supply pressure signal to a critical hydraulic fluid supply pressure; and, determining a solenoid valve fluid intake opening timing.

BRIEF DESCRIPTION OF THE DRAWINGS

The above mentioned and other features and advantages of the embodiments described herein, and the manner of attaining them, will become apparent and better understood by reference to the following descriptions of multiple example embodiments in conjunction with the accompanying drawings. A brief description of the drawings now follows.

DETAILED DESCRIPTION OF THE EMBODIMENTS

Identically labeled elements appearing in different figures refer to the same elements but may not be referenced in the description for all figures. The exemplification set out herein illustrates at least one embodiment, in at least one form, and such exemplification is not to be construed as limiting the scope of the claims in any manner. Certain terminology is used in the following description for convenience only and is not limiting. The words "inner," "outer," "inwardly," and "outwardly" refer to directions towards and away from the parts referenced in the drawings. Axially refers to directions along a diametric central axis. Radially refers to directions that are perpendicular to the central axis. Circumferentially refers to an outer boundary of a circle or curve. The words "left" and "right" designate directions in the drawings to which reference is made. The terminology includes the words specifically noted above, derivatives thereof, and words of similar import.

Figure 5:
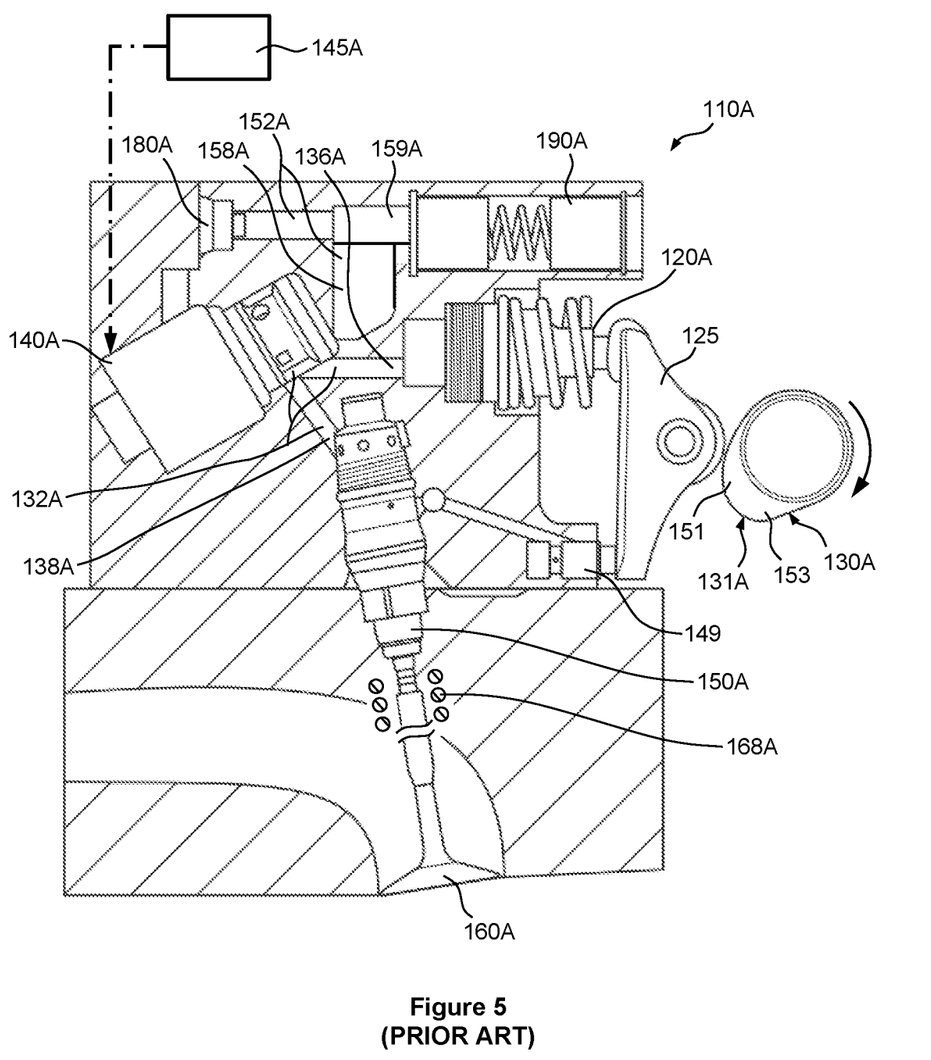
FIG. 5 is a cross-sectional view of a prior art VVL system.

A cross-sectional view of a prior art variable valve lift (VVL) system 110A for an internal combustion (IC) engine is shown in FIG. 5. The VVL system 110A includes a high pressure pump 120A that is actuated by an actuator formed as a camshaft lobe 130A. As the camshaft lobe 130A rotates clockwise, an opening flank 151 of a camshaft lift profile 131A engages a drive element formed as a roller finger follower 125 that pivots against a pivot element 149 to actuate the high pressure pump 120A. As the camshaft lobe 130A rotates further clockwise, a closing flank 153 of the camshaft lift profile 131A engages the roller finger follower 125, reducing displacement of the high pressure pump 120A. Those that are familiar with the art of IC engine valve trains know that many different forms of drive elements are possible. A first high pressure fluid gallery 136A fluidly connects the high pressure pump 120A to a solenoid valve 140A; and, a second high pressure fluid gallery 138A fluidly connects the solenoid valve 140A to a pressure translating device 150A that is engaged with an engine valve 160A. The first and second high pressure fluid galleries 136A, 138A, and optionally, a portion of the solenoid valve 140A, form a high pressure chamber 132A. A first and a second middle pressure fluid gallery 158A, 159A fluidly connect an inlet of the solenoid valve 140A to a one-way valve 180A and together form a middle pressure chamber 152A. The solenoid valve 140A, capable of either an open or closed state, selectively fluidly connects the high pressure chamber 132A to the middle pressure chamber 152A. The middle pressure chamber 152A can be formed of one or more fluid galleries of various sizes and shapes. An optional pressure accumulator 190A can be arranged in fluid connection with the middle pressure chamber 152A. The pressure accumulator 190A serves as a hydraulic fluid pressure storage device that can facilitate fluid replenishment of the high pressure chamber 132A when needed. A brief explanation of how the variable valve lift system 110A actuates the engine valve 160A now follows.

Rotation of the camshaft lobe 130A causes the drive element 125 to pivot upon the pivot element 149 at one end to cause actuation of the high pressure pump 120A at an opposite end. Actuation of the high pressure pump 120A increases hydraulic fluid pressure within the first and second high pressure fluid galleries 136A, 138A. The solenoid valve 140A, typically that of a fast-acting on/off configuration that provides either a closed or open state, determines whether the fluid pressure created by the pump 120A is delivered to either, 1). The middle pressure chamber 152A (solenoid valve 140A in an open state); or, 2). The pressure translating device 150A (solenoid valve 140A in a closed state). If fluid pressure is delivered to the pressure translating device 150A and a resultant force generated by the pressure translation device 150A is enough to overcome a closing force of a valve spring 168A, the engine valve 160A will open. The closed or open state of the solenoid valve 140A (and timing thereof) is managed by a controller 145A. The fast-acting nature of the solenoid valve 140A facilitates precise control of a valve event.

Figure 7A:
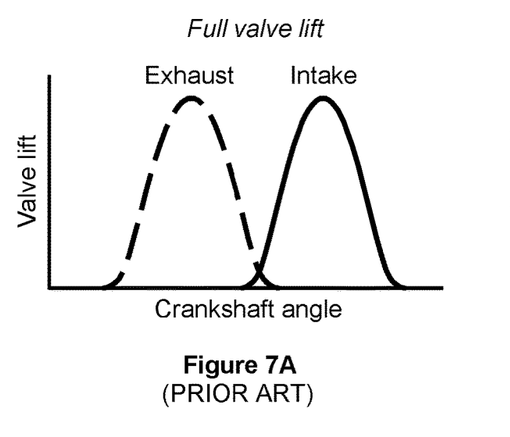
FIGS. 7A-7C are valve lift curves for prior art VVL systems.
Figure 7B:
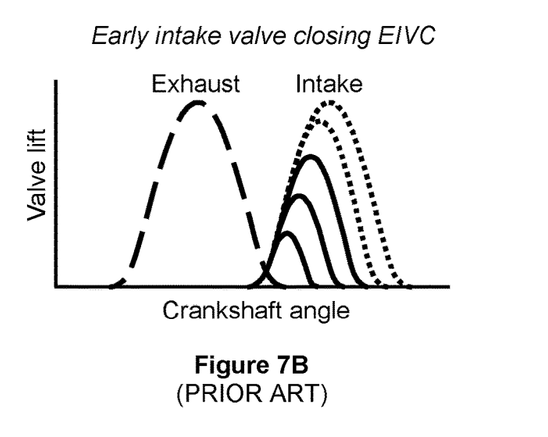
Figure 7C:
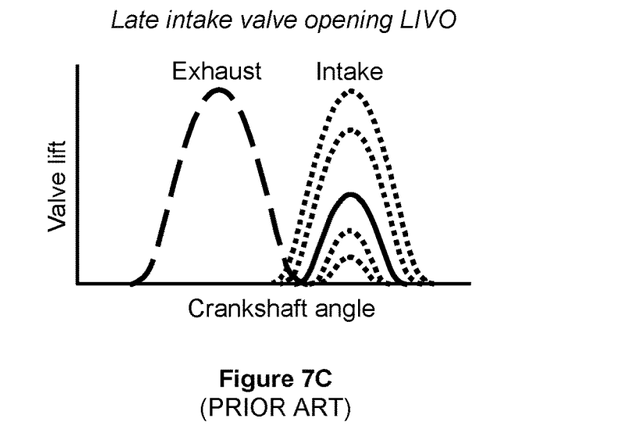

FIGS. 7A through 7C show examples of only a small fraction of various intake valve lift curves that can be achieved by varying the timing of opening or closing the solenoid valve 140A of the VVL system 110A of FIG. 5. The VVL system 110A could also be applied to exhaust valves. FIG. 7A shows a full valve lift for the intake valve, achieved by keeping the solenoid valve 140A closed throughout a camshaft lift event of the camshaft lobe 130A. FIG. 7B shows multiple early intake valve closing (EIVC) lift curves that are attainable by opening the solenoid valve 140A after the intake valve 160A begins to open and while the opening flank 151 of the camshaft lift profile 131A is engaging the drive element 125 of the VVL system 110A. FIG. 7C shows multiple late intake valve opening (LIVO) lift curves that are attainable by allowing a portion of the opening flank 151 of the camshaft lift profile 131A to engage the drive element 125 while the solenoid valve 140A is in an open state, followed by a closed state of the solenoid valve 140A while the opening flank 151 of the camshaft lift profile 131A is engaging the drive element 125.

After each intake valve event that is controlled by the VVL system 110A, refilling of the high pressure chamber 132A with hydraulic fluid is typically needed before the next intake valve lift event occurs. This refilling is enabled by the controller 145A opening the solenoid valve 140A which allows hydraulic fluid to flow from the middle pressure chamber 152A into the high pressure chamber 132A. In some instances, such as cold start conditions, the pressure of the hydraulic fluid in the middle pressure chamber 152A is high, and, therefore, the pressure differential between the middle pressure chamber 152A and the high pressure chamber 132A is also high. Such a large pressure differential can lead to noise-inducing pressure spikes within the high pressure chamber 132A.

Figure 6:
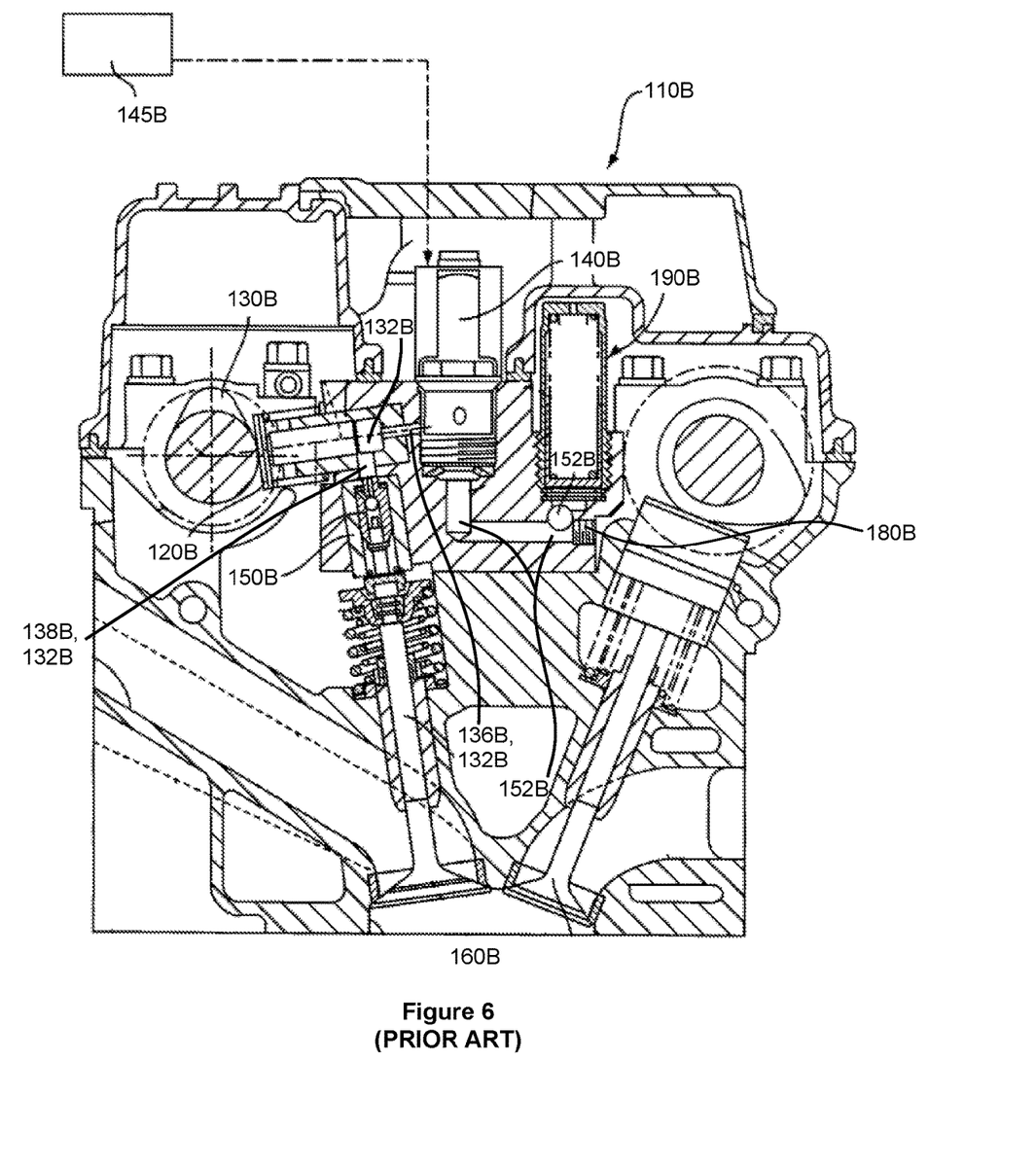
FIG. 6 is a cross-sectional view of another prior art VVL system.

A cross-sectional view of another prior art VVL system 110B is shown in FIG. 6, yet in a slightly different configuration. For this VVL system 110B, an actuator formed as a camshaft lobe 130B engages a high pressure pump 120B directly without the use of a drive element. The high pressure pump 120B is fluidly connected to: a solenoid valve 140B via a first high pressure fluid gallery 136B, and a pressure translating device 150B via a second high pressure fluid gallery 138B. Together, these two high pressure fluid galleries 136B, 138B, and, optionally, a portion of the solenoid valve 140B, form a high pressure chamber 132B. The pressure translating device 150B engages an engine valve formed as an intake valve 160B. The solenoid valve 140B is also fluidly connected to an inlet of a one-way valve 180B and an optional pressure accumulator 190B via multiple fluid galleries that form a middle pressure chamber 152B. Therefore, the solenoid valve 140B, managed by a controller 145B to either an on or off state, selectively fluidly connects the high pressure chamber 132B to the middle pressure chamber 152B. As with the prior art VVL system 110A shown in FIG. 4, filling of the high pressure chamber 132B from the middle pressure chamber 152B can produce noise-inducing hydraulic fluid pressure spikes under certain engine operating conditions.

Figure 1:
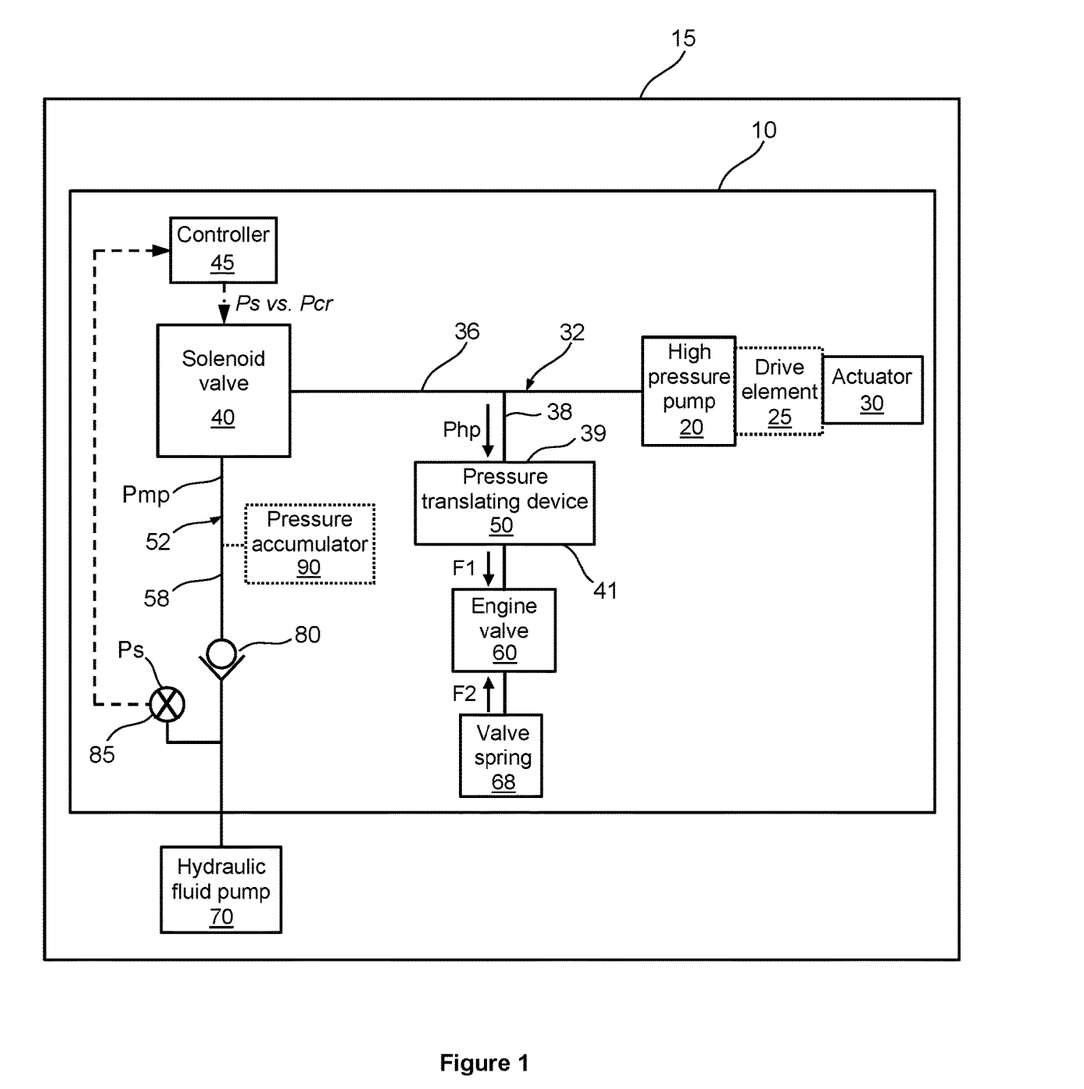
FIG. 1 is a schematic diagram of an example embodiment of a VVL system.

A schematic of an example embodiment of a VVL system 10 for an IC engine 15 is shown in FIG. 1 that addresses the previously described hydraulic fluid flow noise. The VVL system 10 includes a high pressure pump 20 that is fluidly connected to a solenoid valve 40 and a pressure translating device 50. The high pressure pump 20 is actuated by an actuator 30 with the aid of an optional drive element 25. The actuator 30 can be of many forms including that of a camshaft lobe; and the drive element can be of many forms including a roller finger follower. Fluid galleries 36, 38 serve as hydraulic fluid carriers from the high pressure chamber 20 to the solenoid valve 40 and pressure translating device 50, respectively, and form a high pressure chamber 32. A first end 39 of the pressure translating device 50 is in flow communication with the high pressure chamber 32 and a second end 41 is engaged with an engine valve 60. A one-way valve 80 is fluidly connected to an inlet of the solenoid valve 40 which receives pressurized hydraulic fluid from a hydraulic fluid pump 70 of the IC engine 15. A middle pressure fluid gallery 58 resides between the one-way valve 80 and solenoid valve 40, which forms a middle pressure chamber 52. Therefore, the solenoid valve 40 selectively fluidly connects the middle pressure chamber 52 to the high pressure chamber 32. The high pressure chamber 32 or middle pressure chamber 52 can include one or more fluid galleries. An optional pressure accumulator 90 is fluidly connected to the middle pressure chamber 52. The pressure accumulator 90 serves as a hydraulic fluid pressure storage device that can facilitate fluid replenishment of the high pressure chamber 32 when needed.

Hydraulic fluid pressure created by the high pressure pump 20 within the high pressure chamber 32 is controlled by the solenoid valve 40. The solenoid valve 40 receives a signal from an electronic controller 45 to move to an open or closed position; an open position during actuation of the high pressure pump 20 facilitates venting of pressurized hydraulic fluid from the high pressure chamber 32 to the middle pressure chamber 52; a closed position during actuation of the high pressure pump 20 facilitates an increase of hydraulic fluid pressure in the high pressure chamber 32. An engine valve lift event is defined by a magnitude of the hydraulic fluid pressure Php in the high pressure chamber 32 acting on the pressure translating device 50, and a resultant translated force F1 provided by the pressure translating device 50 to the engine valve 60. The relative magnitude of the resultant translated force F1 to the closing force F2 of the valve spring 68 determines a form of a valve lift curve.

A hydraulic fluid pressure sensor 85 is arranged to detect a hydraulic fluid supply pressure Ps of the one-way valve 80 and provides a signal to the electronic controller 45. The electronic controller 45 compares the hydraulic fluid supply pressure Ps to a calculated critical hydraulic fluid supply pressure Pcr to determine a time relative to the valve event to open the solenoid valve 40 for enabling filling of the high pressure chamber 32 by the middle pressure chamber 52 for a next engine valve event.

Figure 2:
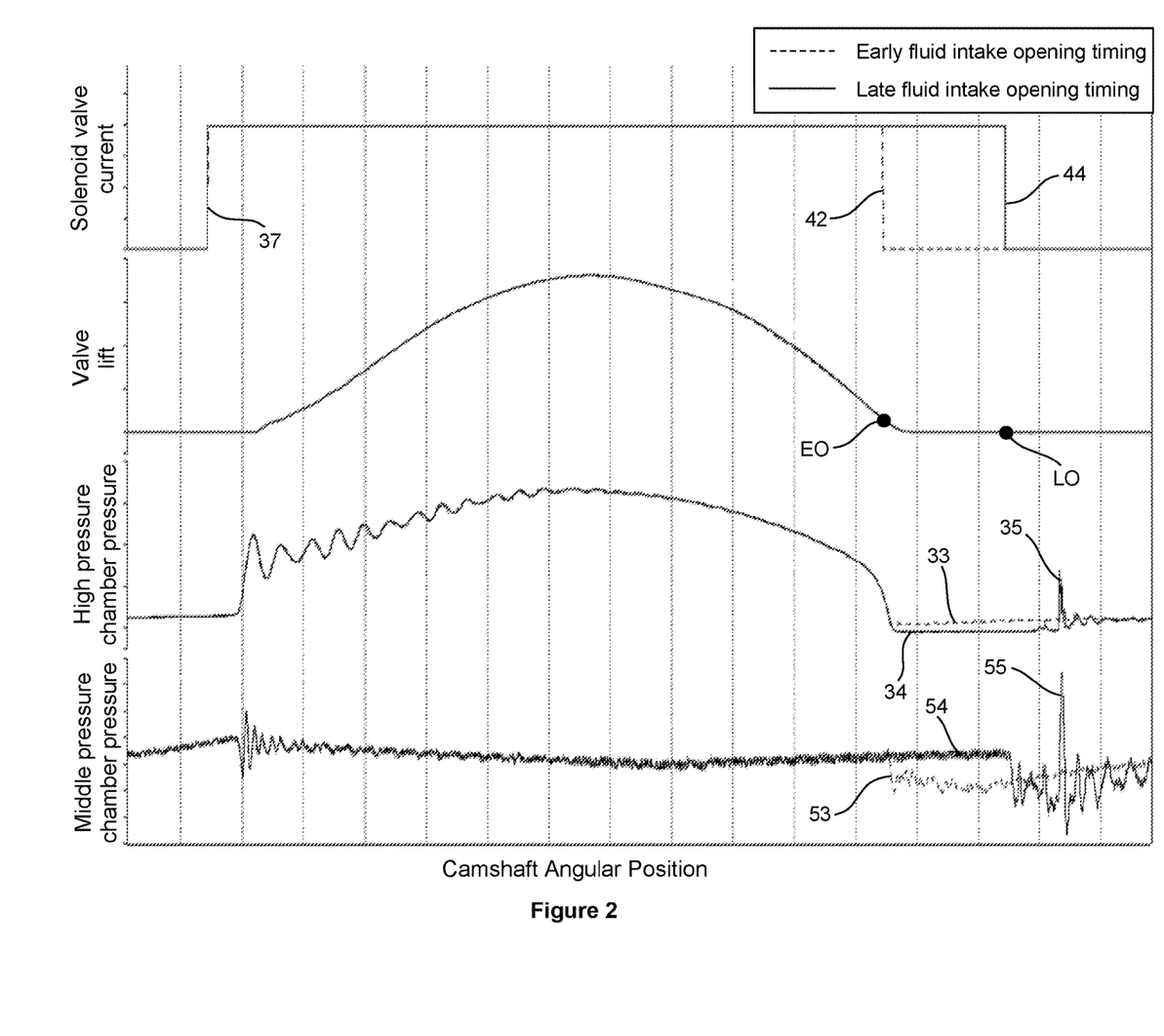
FIG. 2 is a signal diagram for a VVL system with signal traces for early and late fluid intake opening timings.

FIG. 2 shows a signal diagram, derived from testing, for the VVL system 10 of FIG. 1 carrying out a full valve lift event, with a rotating camshaft lobe serving as the actuator 30. Two signals are shown for solenoid valve current, valve lift, high pressure chamber pressure, and middle pressure chamber pressure throughout a partial rotation of the camshaft lobe that facilitates the valve lift event. An early fluid intake opening timing signal is shown with a broken line and a late fluid intake opening timing signal is shown with a solid line for each of the four parameters. An explanation of the early and late fluid intake opening timing signals and their effect on the operation of the VVL system 10 now follows.

The solenoid valve 40 of the VVL system 10 is characterized as being "normally open", meaning that when it is de-energized, it defaults to an open position. It is during this open position that the high pressure chamber 32 is fluidly connected to the middle pressure chamber 52 by the solenoid valve 40. Referring to the plot of solenoid valve current vs. camshaft angular position with view to the valve lift plot just beneath it, for both the early and late fluid intake opening timing signals for solenoid valve current 42, 44, the solenoid valve 40 is energized, evidenced by a current rise 37, to achieve a closed position before the opening of the engine valve 60. This closed position prevents fluid from escaping the high pressure chamber 32, and facilitates an increase in high pressure chamber pressure Php, that, when applied to the pressure translating device 50, translates to a force F1 that can overcome the valve spring 68 to open the engine valve 60. Upon completion of the valve lift event, due to fluid leakage that occurs within the VVL system during a valve lift event, the high pressure chamber 32 is typically replenished by the middle pressure chamber 52. This is accomplished by de-energizing the solenoid valve 40, returning it to its default open position, which fluidly connects the middle pressure chamber 52 to the high pressure chamber 32. It is commonplace to time this de-energizing of the solenoid valve 40 until after the valve lift event to avoid any effect on the valve lift. The late fluid intake opening traces of FIG. 2 correspond to this solenoid valve de-energizing timing. Referring to the late fluid intake opening timing trace for solenoid valve current 44, the timing of the solenoid valve opening (de-energizing) corresponds to a point LO after the valve lift event. The late fluid intake opening traces for the high pressure chamber pressure 34 and middle pressure chamber pressure 54, show that pressure spikes 35, 55 can occur in these respective chambers at certain hydraulic fluid supply pressure Ps conditions, leading to an audible hydraulic fluid flow noise, such as a clicking noise. In order to alleviate or eliminate the pressure spikes 35, 55 of the respective high pressure 32 and middle pressure 52 chambers and resultant noise, an early fluid intake opening timing of the solenoid valve 40 can be implemented.

Signal traces that correspond to the early fluid intake opening timing of the solenoid valve 40 are shown in broken lines within FIG. 2. For this timing strategy, the solenoid valve 40 is de-energized while the engine valve 60 is closing. Referring to the early fluid intake opening timing trace for solenoid valve current 42, the timing of the solenoid valve opening (de-energizing) corresponds to a point EO during the valve lift event. As evident by the early fluid intake opening timing trace 33 for the high pressure chamber pressure Php, the solenoid valve 40 opens when the high pressure chamber pressure Php is higher; also, at this time, a fluid volume of the high pressure pump 20 is increasing as, for example, a closing flank of a camshaft engages the high pressure pump 20. These conditions alleviate or eliminate any noise-inducing pressure spikes in the high pressure 32 and middle pressure 52 chambers, as evident by the respective early fluid intake opening timing traces 33, 53. Furthermore, negligible valve lift effects result from the early fluid intake opening strategy, as the engine valve 60 is nearly closed when influences of the early fluid intake opening timing strategy are translated to the high pressure chamber 32.

Figure 4A:
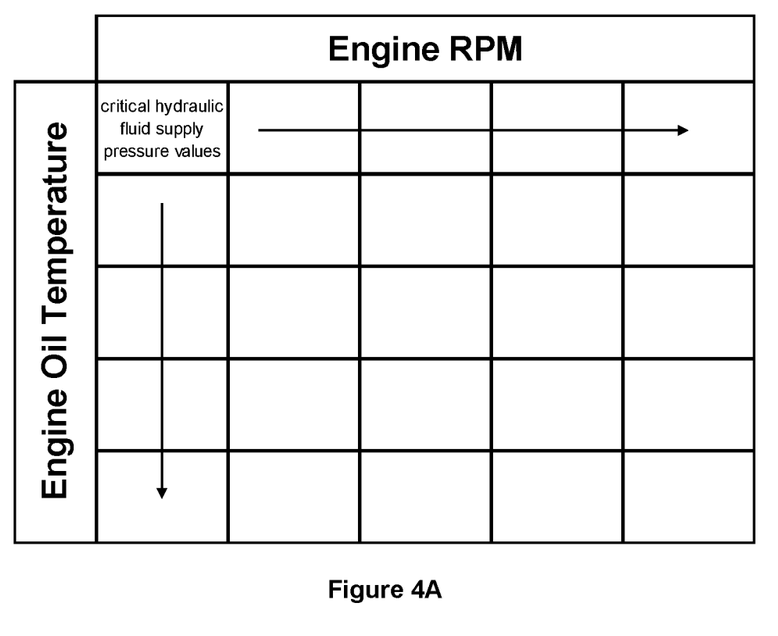
FIGS. 4A-4B are example embodiments of look-up tables for the VVL system of FIG. 1.
Figure 4B:
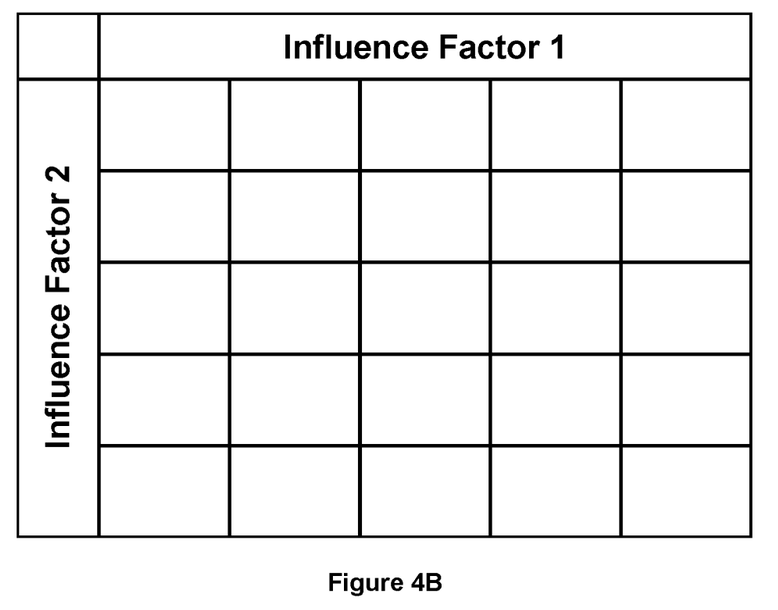

Executing a proper fluid intake opening timing for the solenoid valve 40 requires: 1). Feedback from the hydraulic fluid pressure sensor 85 which monitors hydraulic fluid supply pressure Ps provided by the hydraulic fluid pump 70 of the IC engine 15; and, 2). Defining an ideal fluid intake opening timing for different engine operating conditions to avoid noise generated by the hydraulic fluid exchange between the middle pressure 52 and high pressure 32 chambers. For item 2 above, testing is required to determine which engine operating conditions and hydraulic fluid supply pressures Ps facilitate the previously described hydraulic noise. The defined engine operating conditions may include engine speed, hydraulic fluid temperature, and hydraulic fluid viscosity. Engine calibration look-up tables could be established that are utilized by the electronic controller 45 to manage the fluid intake opening timing, or, alternatively stated, to determine the timing within an engine cycle at which the solenoid valve 40 is opened to refill the high pressure chamber 32 after a valve event. These look-up tables could provide critical hydraulic fluid pressures Pcr at which noise is likely to occur for various engine conditions; if a measured hydraulic fluid supply pressure Ps is greater than the critical hydraulic fluid pressure Pcr, an early fluid intake opening timing strategy could be implemented; FIG. 4A provides an example of such a look-up table. While many different early fluid intake opening strategies are possible, one example strategy could be to have one early fluid intake opening timing for all instances where Ps≥Pcr and one late fluid intake opening timing for all instances where Ps≤Pcr. Some strategies could utilize more influence factors on critical hydraulic supply pressure Pcr, captured in look-up tables such as the one shown in FIG. 4B.

Figure 3:
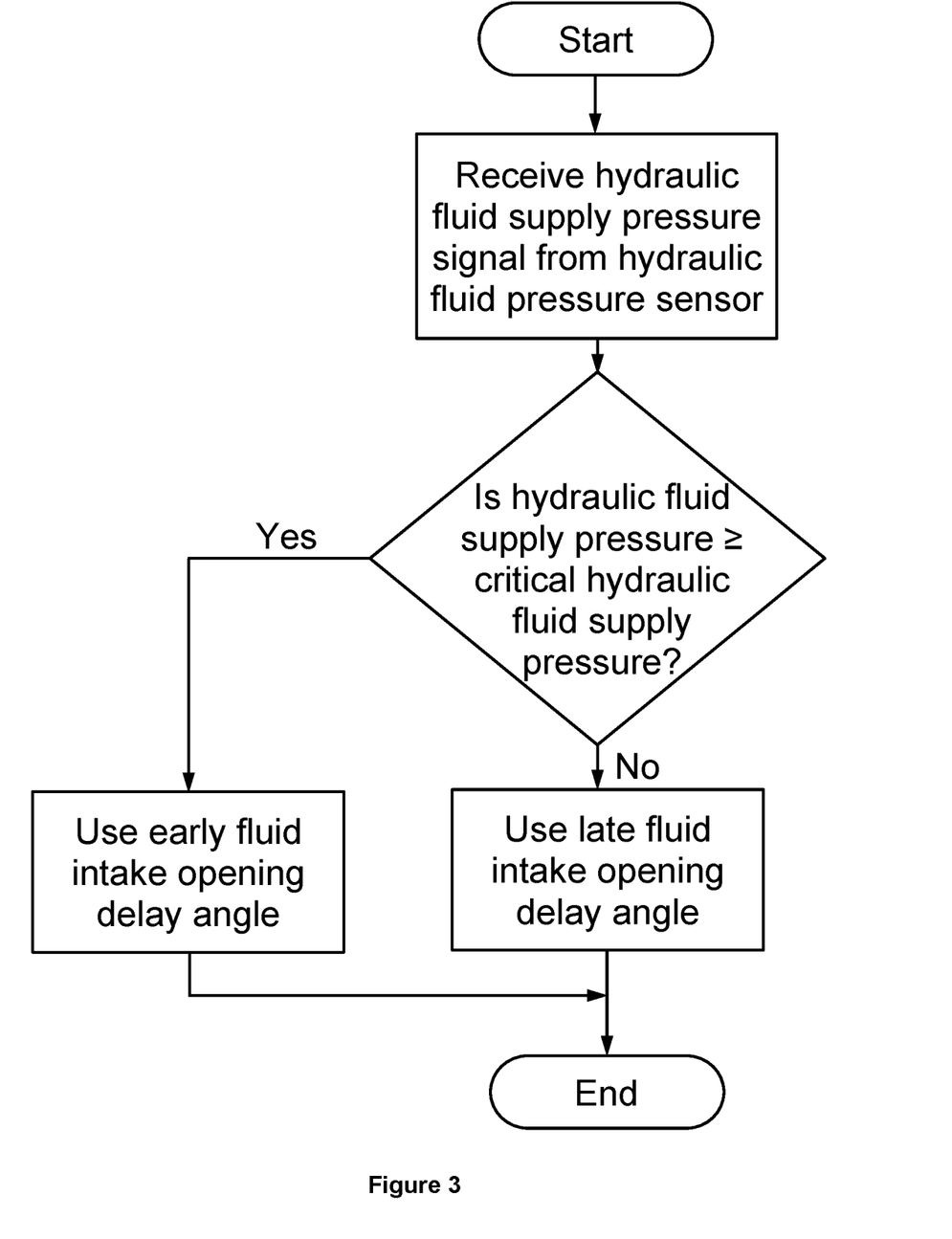
FIG. 3 is a flow diagram for an example embodiment of a method for operating a VVL system.

Referring now to FIG. 3, a method of operating a solenoid valve of a VVL system is shown. Although the method is presented as a sequence of steps for clarity, no order should be inferred from the sequence unless explicitly stated. A first step receives a hydraulic fluid supply pressure signal from a hydraulic fluid pressure sensor. A second step compares the received hydraulic fluid supply pressure signal to a critical hydraulic fluid supply pressure. A third step determines a solenoid valve fluid opening timing that prevents hydraulic fluid flow noise from occurring in the VVL system.

In the foregoing description, example embodiments are described. The specification and drawings are accordingly to be regarded in an illustrative rather than in a restrictive sense. It will, however, be evident that various modifications and changes may be made thereto, without departing from the broader spirit and scope of the present invention.

In addition, it should be understood that the figures illustrated in the attachments, which highlight the functionality and advantages of the example embodiments, are presented for example purposes only. The architecture or construction of example embodiments described herein is sufficiently flexible and configurable, such that it may be utilized (and navigated) in ways other than that shown in the accompanying figures.

Although example embodiments have been described herein, many additional modifications and variations would be apparent to those skilled in the art. It is therefore to be understood that this invention may be practiced otherwise than as specifically described. Thus, the present example embodiments should be considered in all respects as illustrative and not restrictive.

What we claim is:

1. A variable valve lift system for an internal combustion engine, the system comprising:
   a solenoid valve configured to selectively fluidly connect a middle pressure chamber to a high pressure chamber, the high pressure chamber configured to actuate an engine valve of the internal combustion engine; and,
   a controller configured to: i) determine a fluid intake opening timing of the solenoid valve by comparing a measured hydraulic fluid supply pressure of the middle pressure chamber to a critical hydraulic fluid supply pressure, the fluid intake opening timing configured to facilitate replenishment of the high pressure chamber from the middle pressure chamber during or after a valve lift event of the engine valve during operation of the internal combustion engine, and ii) open the solenoid valve according to the determined fluid intake opening timing; and
   the solenoid valve fluidly connected to a high pressure pump configured to be actuated by a camshaft.

2. The variable valve lift system of claim 1, wherein the solenoid valve is configured to enable hydraulic fluid flow from the high pressure chamber to the middle pressure chamber.

3. The variable valve lift system of claim 2, wherein varying a timing of hydraulic fluid flow from the high pressure chamber to the middle pressure chamber is configured to change a valve lift curve of the engine valve.

4. The variable valve lift system of claim 1, wherein the solenoid valve is configured to be fluidly connected to a low pressure pump.

5. The variable valve lift system of claim 4, further comprising a one-way valve arranged to be fluidly connected to the middle pressure chamber and the low pressure pump.

6. The variable valve lift system of claim 5, further comprising a pressure accumulator arranged to be fluidly connected to at least one of the solenoid valve or the one-way valve.

7. The variable valve lift system of claim 1, wherein the measured hydraulic fluid supply pressure is configured to be provided by a hydraulic fluid pressure sensor.

8. The variable valve lift system of claim 1, wherein the fluid intake opening timing is configured to occur during a camshaft lift profile when the measured hydraulic fluid supply pressure is greater than the critical hydraulic fluid supply pressure.

9. The variable valve lift system of claim 1, wherein the fluid intake opening timing is configured to occur after a camshaft lift profile when the measured hydraulic fluid supply pressure is less than the critical hydraulic fluid supply pressure.

10. The variable valve lift system of claim 1, wherein the fluid intake opening timing occurs on a closing flank of a camshaft lift profile.

11. The variable valve lift system of claim 10, wherein the camshaft lift profile is an intake camshaft lift profile.

12. The variable valve lift system of claim 1, wherein the fluid intake opening timing and the valve lift event are configured to occur during a same combustion cycle of the internal combustion engine.

13. A variable valve lift system for an internal combustion engine, the system comprising:
   a solenoid valve configured to selectively fluidly connect a middle pressure chamber to a high pressure chamber, the high pressure chamber configured to actuate an engine valve of the internal combustion engine; and,
   a controller configured to: i) determine a fluid intake opening timing of the solenoid valve by comparing a measured hydraulic fluid supply pressure of the middle pressure chamber to a critical hydraulic fluid supply pressure, the fluid intake opening timing configured to facilitate replenishment of the high pressure chamber from the middle pressure chamber during or after a valve lift event of the engine valve during operation of the internal combustion engine, and ii) open the solenoid valve according to the determined fluid intake opening timing; and
   the solenoid valve configured to be fluidly connected to a first pump and a second pump.

14. The variable valve lift system of claim 13, wherein the fluid intake opening timing is configured to occur during a camshaft lift profile when the measured hydraulic fluid supply pressure is greater than the critical hydraulic fluid supply pressure.

15. The variable valve lift system of claim 13, wherein the fluid intake opening timing is configured to occur after a camshaft lift profile when the measured hydraulic fluid supply pressure is less than the critical hydraulic fluid supply pressure.

16. The variable valve lift system of claim 13, wherein the solenoid valve is configured to be open when de-energized.

17. The solenoid valve of claim 13, wherein the valve lift event and the fluid intake opening timing are configured to occur during a same combustion cycle of the internal combustion engine.

18. A variable valve lift system for an internal combustion engine, the system comprising:
- a solenoid valve fluidly connected to at least one first fluid gallery and at least one second fluid gallery, the solenoid valve configured to provide, in an open state, hydraulic fluid refilling of the at least one second fluid gallery by the at least one first fluid gallery, or hydraulic fluid flow from the at least one second fluid gallery to the at least one first fluid gallery; and,
- a controller configured to: i) determine a fluid intake opening timing of the solenoid valve by comparing a measured hydraulic fluid supply pressure of the at least one first fluid gallery to a critical hydraulic fluid pressure, and ii) open the solenoid valve according to the determined fluid intake opening timing; and
- the fluid intake opening timing configured to occur when a crankshaft of the internal combustion engine is being powered by combustion pressure of the internal combustion engine.

19. The variable valve lift system of claim 18, wherein the measured hydraulic fluid supply pressure is configured to be provided by a pressure sensor.

\* \* \* \* \*